June 30, 1931.                A. S. RAMAGE                1,812,372
PROCESS OF OBTAINING AROMATIC HYDROCARBONS
Filed May 18, 1928
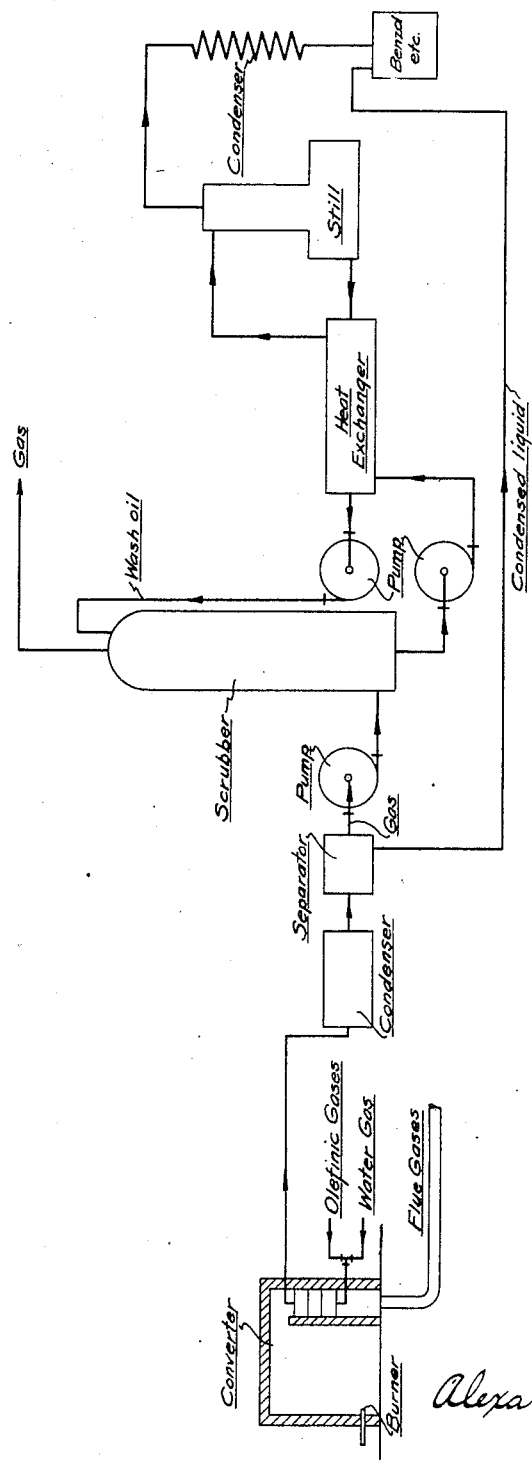
Inventor.
Alexander S. Ramage
By Byrnes Townsend & Brickenstein
his Attorneys.

Patented June 30, 1931

1,812,372

UNITED STATES PATENT OFFICE

ALEXANDER S. RAMAGE, OF DETROIT, MICHIGAN, ASSIGNOR TO COALS AND CHEMICALS, LTD., A CORPORATION OF NEVADA

PROCESS OF OBTAINING AROMATIC HYDROCARBONS

Application filed May 18, 1928. Serial No. 278,916.

The present invention relates to the production of aromatic hydrocarbons from water gas, or its component gases, and olefinic gases.

The olefinic gases, which are subjected to this treatment may be produced in any suitable manner. For example, they may be obtained by treatment of paraffin hydrocarbons according to the methods described in my Patents No. 1,224,787 and No. 1,403,194, or even by the process described in Patent No. 1,205,578 to Strache & Porges. They may also be obtained by dehydrogenating light weathered products and casing head gasoline vapors over ferric oxide or cupric oxide, according to the method described in my Patent No. 1,224,787.

The water gas, i. e., any gas consisting essentially of hydrogen and carbon monoxide, may come from any suitable source such as standard water gas producers; or the mixture may of course be prepared from hydrogen and carbon monoxide from any source.

The water gas mixed with a suitable proportion of olefinic gases containing not above five carbon atoms per molecule is passed through a series of tubes at about atmospheric pressure containing metallic iron such as turnings or finely divided reduced iron maintained at a temperature of 1000° F. to 1500° F. The suitable proportion above mentioned of olefinic gases to water gas must be such as to keep the iron always in the active condition. The reactions are complicated and not fully known but the issuing gases contain large quantities of the hydrocarbons of the aromatic series including benzol, toluol, xylol, etc., which can be condensed and washed out of the gases by any of the standard methods. The gas from the wash oil scrubbers after the extraction of the aromatic hydrocarbons is of very high heat value running generally over 1000 B. t. u. and can be utilized for mixing with gases of low heat value to carburet them. The reactions may be as follows:

The metallic iron presumably acts as a catalyst in transferring the oxygen of the carbon monoxide to the olefinic hydrocarbons which, as stated above, must be in such quantity as to keep the iron in the active condition.

The reduced metallic iron in the tubes ordinarily requires no attention, but may, if for any reason it becomes oxidized or contaminated with impurities, be renewed by suitable treatment with reducing gases, or replaced by fresh material.

The olefinic gases and vapors subjected to this treatment should be nearly or quite free from paraffin hydrocarbons, as, if these are present in any considerable amount, cracking results and the accompanying deposition of carbon tends to plug up the exit tubes or otherwise to interfere with the operation.

In order to insure the substantial absence of any paraffin hydrocarbons, it may even be desirable to subject the gases to a preliminary treatment by passing them at a suitable temperature over ferric oxide or cupric oxide, by which such paraffin hydrocarbons will be converted into olefinic gases.

While I have referred specifically to gases and vapors of the olefinic type, $C_nH_{2n}$, my process may also be applicable to the further unsaturated gases, such as the acetylene series, $C_nH_{2n-2}$, or the terpene series, $C_nH_{2n-4}$, and such gases are included in the term "olefinic" as used in the claims.

The accompanying diagrammatic drawing illustrates a plant for carrying out the process.

The olefinic gases mixed with water gas or its components are passed through a "converter" which comprises a series of tubes containing metallic iron, heated to the temperatures above described. The vapors from the converter are passed through a condenser and separator for the removal of any condensable aromatics. The cooled gas from the separator is then scrubbed in a tower by contact with a suitable wash-oil introduced at the top of the tower. The absorbent wash-oil is then delivered, preferably through a heat exchanger, to a still in which the aromatics and other volatile ingredients are driven off and condensed. The residual oil from the still passes through the heat-exchanger to the top of the scrubbing tower, from which the scrubbed gas goes to a holder or place of use.

The condensate from the wash-oil is preferably mixed with the condensate from the condenser. The mixed condensate may be used for blending with gasoline to produce a high-compression motor fuel or it can be refined in the well-known manner for the production of pure benzol, toluol, xylol, etc.

I prefer to use 3 inch tubes 10 feet long set in manifolds, the manifolds set preferably in groups of three. The gases enter the lower manifold then pass through the middle manifolds and finally through the upper manifold so that they pass through 30 feet of the tube filled with metallic iron. The manifolds are set in the usual way in a combustion chamber, the heating gases preferably passing downward over the upper manifold first and issuing below the lowest manifold. In this way the upper manifold naturally is hotter than the lower. A suitable mixture of gases per tube per hour is 600 cu. ft. of water gas and 400 cu. ft. of olefinic gases of the average composition represented by the formula $C_4H_8$. With this amount per hour per tube the total length of the tubes preferably is, as stated above, about 30 feet and the temperature in the lowest or entry manifold is about 1100° F. and in the upper or issuing manifold about 1200° F. If the temperatures are increased to 1400° F. and 1500° F. respectively, the amount of gas passed through the tubes must be increased to about 1500 cu. ft. per hour. If the olefinic gases are of lower molecular weight, the proportion thereof to water-gas in the mixture must be increased accordingly bearing in mind that the regulating feature is that the iron must be maintained always in the active condition.

The gas issuing from the manifolds is characterized by the substantial absence of $CO_2$ usually less than 1%, which fact seems to show that iron which may have been oxidized is not reduced by CO, but the oxygen is transferred to the hydrocarbon present in the gas mixture.

Although as a matter of fact, metallic iron is not appreciably oxidized in the presence of water gas even in the absence of olefinic gas, it has been found that in the presence of olefinic gases in insufficient proportion the iron loses its catalytic effectiveness after a time and must be revivified by treatment with water gas alone or olefinic gas alone or a mixture much richer in olefinic gases.

I claim:

1. Process which comprises contacting a mixture containing olefinic gaseous hydrocarbons and the components of water gas with metallic iron at a temperature of from about 1000° F. to about 1500° F. at substantially atmospheric pressure, regulating the proportion of olefinic gases to water gas so that the iron is maintained in the active condition, and recovering liquid aromatic hydrocarbons from the resulting vapors.

2. Process for the production of hydrocarbons of the aromatic series from olefinic gases and the components of water gas which comprises contacting a suitable mixture of said gases with metallic iron maintained in the active condition at a temperature of from 1000° F. to 1500° F. at substantially atmospheric pressure.

3. Process of producing hydrocarbons of the aromatic series from a gaseous mixture of hydrogen, carbon monoxide and an olefinic hydrocarbon, comprising contacting said mixture, at substantially atmospheric pressure, with an iron catalyst at a temperature of at least about 1000° F.

In testimony whereof, I affix my signature.

ALEXANDER S. RAMAGE.